June 26, 1951  C. W. PARKE  2,558,151
SPRING SUPPORTED TRACTOR SEAT
Filed March 21, 1946
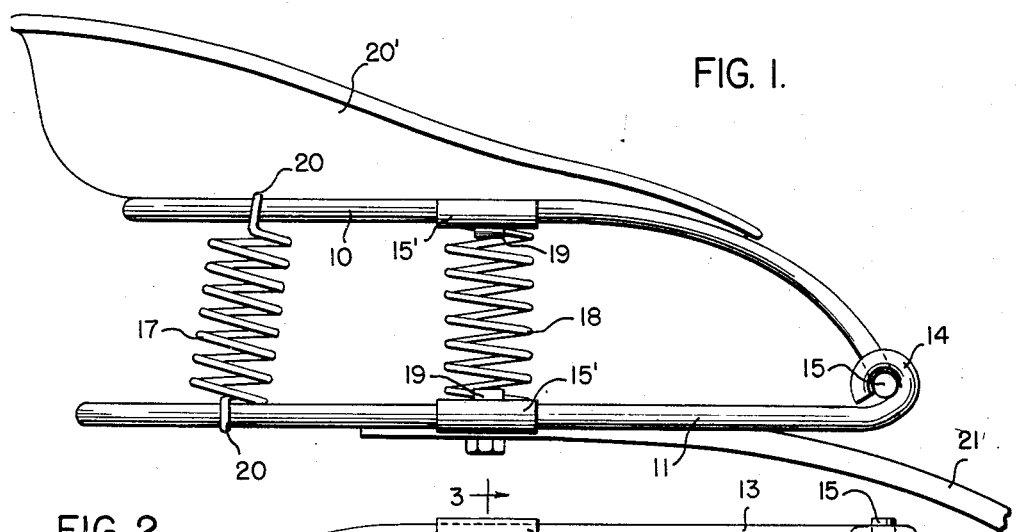
FIG. 1.
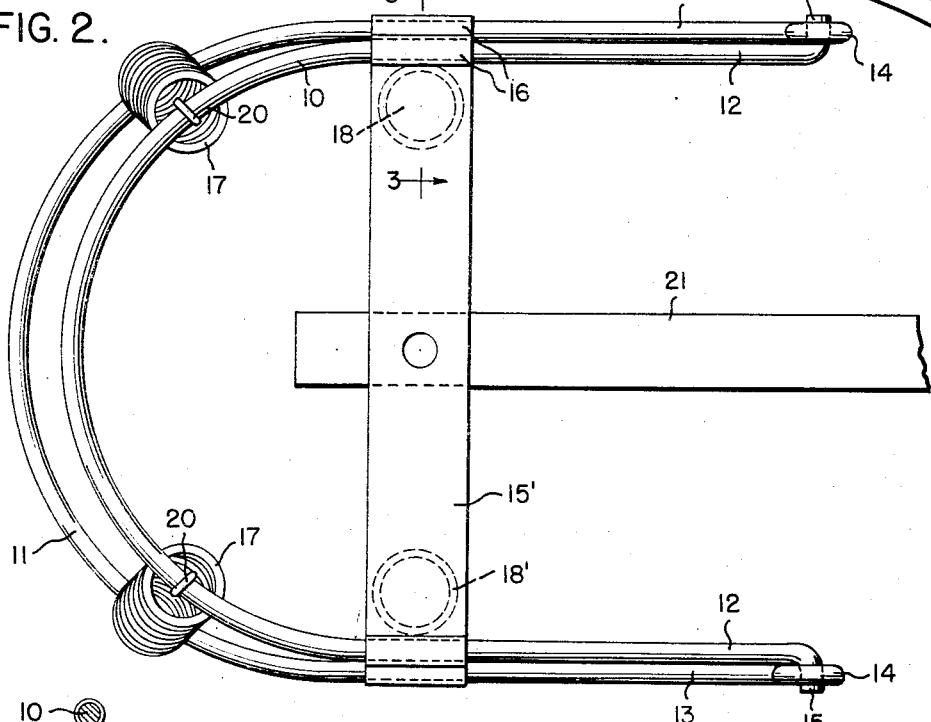
FIG. 2.
FIG. 3.
INVENTOR.
CHARLES W. PARKE,
BY *Victor J. Evans & Co.*
ATTORNEYS Patented June 26, 1951

2,558,151

UNITED STATES PATENT OFFICE 2,558,151

SPRING SUPPORTED TRACTOR SEAT

Charles W. Parke, Burlington, Colo.

Application March 21, 1946, Serial No. 656,082

2 Claims. (Cl. 155—55)

The invention relates to a seat construction, and particularly to a spring seat for vehicle farming implements, tractors or the like.

The primary object of the invention is the provision of a seat of this character, wherein shocks and jars incident to the travel of a vehicle, implement or the like, will be absorbed, so as to relieve the occupant of severe vibrations resultant from the travel of the vehicle, implement or the like, when passing over rough surfaces, particularly tractors, where the seat is whipped, snapped and violently vibrated, as the tractor itself is springless in the assembly thereof.

Another object of the invention is the provision of a seat of this character, wherein the construction thereof is novel in its entirety, and is unique in the assembly of these parts, thus assuring reasonable comfort to an occupant when riding the vehicle, implement or the like.

A further object of the invention is the provision of a seat of this character, which is simple in construction, thoroughly reliable and efficient in its purposes, strong, durable, readily and easily installed or removed, having maximum shock absorbing qualities, and being inexpensive to manufacture and install.

With these and other objects in view the invention consists in the features of construction, combination and arrangement of parts as will be hereinafter more fully described, illustrated in the accompanying drawing, which will disclose the preferred embodiment of the invention, and pointed out in the claims hereunto appended.

In the accompanying drawing:

Figure 1 is a side elevation of a seat constructed in accordance with the invention;

Figure 2 is a top plan view with the seat proper removed;

Figure 3 is a sectional view taken on the line 3—3 of Figure 2 looking in the direction of the arrows.

Similar reference characters indicate corresponding parts throughout the several views in the drawing.

Referring to the drawing in detail, the seat in its entirety constituting the present invention, comprises a pair of substantially U-shaped yoke frames 10 and 11, respectively, which are arranged one above the other, with both disposed in substantially horizontal planes spaced from each other under normal conditions. The frame 10 is formed with downwardly curved side arms 12 which are at the open end of such frame and remote from the opposite closed end thereof. The side arms 13 of the frame 11 are straight, and both frames are inherently rigid.

The ends of the frame 11, that is to say, the side arms 13 thereof remote from the closed end of such frame, have formed therefrom vertically upstanding pivot eyes 14, while the ends next thereto of the side arms 12 of the frame 10, have formed therefrom out turned laterally projected hinge pintles 15, which loosely engage in the eyes 14, and in this manner the frames 10 and 11 are hinged together for the vertical swing of the upper frame 10 relative to the lower frame 11, as will be apparent from Figures 1 and 2 of the drawing.

The frames 10 and 11 have disposed transversely thereof horizontally fixed cross straps 15', which have terminal sleeve couplings 16 with the side arms 12 and 13 respectively, of these frames, intermediate of the ends thereof.

Between the frames 10 and 11 and the cross straps 15 fixed thereto are groups of shock absorbing springs 17 and 18 respectively, the latter springs being tacked at 19 to the straps 15 of the frames, while the springs 17 are terminally looped at 20 thereto, the springs 18 being compression springs and the springs 17 being tensioning springs, which counteract to each other.

The frame 10 has made fast thereto a seating saddle 20 which may be secured in place thereon in any suitable manner, while the cross strap 15 of the frame 11 at its center has fixed connection with a supporting or hanger standard, only a portion of the same being indicated at 21 and is a part of a vehicle, implement or the like, as for example, a tractor, not shown, and this standard may be inherently springy, as is usual.

The seat constituting the present invention in its construction absorbs all shocks and jars incident to the travel of the vehicle, implement or the like, and dampens vibration for the rider or occupant of the seat, as should be obvious, the latter being applicable to various types of vehicles, implements or the like and affording comfort to a user.

What is claimed is:

1. A seat of the kind described comprising upper and lower superposed rigid U-shaped frames, vertically disposed pivot eye formations formed on the ends of said lower frame, laterally projected hinge pintles formed on the ends of said upper frame, said pintles being received in said eye formations to form a hinge connection between the ends of said frames, for the relative vertical swing of the upper frame to the lower frame, a seating cradle carried by the upper frame, cross straps connected to the frames transversely thereof below the seating cradle, a pair of counteracting springs connected at their ends to the opposite ends of the cross straps between the cross straps and a second pair of counteracting springs attached directly to the frames therebetween at points relatively spaced from said first springs.

2. A seat of the kind described comprising a first and second superposed rigid U-shaped frames, vertically disposed pivot eye formations formed on the ends of said second frame, laterally projecting hinge pintles formed on the ends of said first frame, said pintles being received in said eye formations to form a hinge connection between the ends of said frames for the relative swing of the first frame to the second frame, a seating cradle carried by the first frame, cross straps connected to the frames transversely thereof below the seating cradle, a first pair of resilient members connected at their ends to the opposite ends of the cross straps between the cross straps, and a second pair of resilient members attached directly to the frames therebetween at points relatively spaced from said first resilient members.

CHARLES W. PARKE.

REFERENCES CITED

The following references are of record in the file of this patent:

UNITED STATES PATENTS

| Number | Name | Date |
|---|---|---|
| 709,619 | Wangerin | Sept. 23, 1902 |
| 1,155,893 | Crippen | Oct. 5, 1915 |
| 1,928,939 | Larsen | Oct. 3, 1933 |